United States Patent [19]

Kerebel

[11] Patent Number: 4,553,565

[45] Date of Patent: Nov. 19, 1985

[54] LIQUID STORAGE RESERVOIR WITH CAPILLARY CONFINEMENT

[75] Inventor: Alain Kerebel, Paris, France

[73] Assignee: Matra, Paris, France

[21] Appl. No.: 622,322

[22] Filed: Jun. 19, 1984

[30] Foreign Application Priority Data

Jun. 20, 1983 [FR] France ............................ 83 10161

[51] Int. Cl.[4] ............................................ B64D 37/08
[52] U.S. Cl. ................................. 137/590; 244/135 R
[58] Field of Search ............................. 137/590, 154; 244/135 R, 158 R

[56] References Cited

U.S. PATENT DOCUMENTS

| | | | |
|---|---|---|---|
| 2,884,937 | 5/1959 | Myers, Jr. | 137/590 X |
| 2,920,648 | 1/1960 | Sheffer | 137/590 X |
| 2,946,345 | 7/1960 | Weltmer | 137/590 |
| 3,202,160 | 8/1965 | Barger | 137/590 X |
| 3,744,738 | 7/1973 | Howard | 244/158 |
| 4,168,718 | 9/1979 | Hess et al. | 137/590 X |
| 4,399,831 | 8/1983 | Robert | 137/590 X |
| 4,467,985 | 8/1984 | Salvatore | 137/590 X |

FOREIGN PATENT DOCUMENTS

| | | | |
|---|---|---|---|
| 1444982 | 5/1966 | France | 137/590 |
| 2254494 | 5/1975 | France | 137/590 |
| 2372642 | 6/1978 | France | 137/590 |

Primary Examiner—Alan Cohan
Assistant Examiner—John A. Rivell
Attorney, Agent, or Firm—Larson and Taylor

[57] ABSTRACT

The reservoir, usable more especially in a satellite, comprises a liquid outlet passage having a surface tension confinement device defining a buffer zone communicating with the outlet passage and, through orifices and a meniscus rupture zone, with supply ducts provided along the wall of the reservoir. The orifices are capillary and are provided in a wall situated in the immediate proximity of the point of drawing-off through the outlet passage (12), defining, with a capillary storage volume, a dead space of small volume.

11 Claims, 7 Drawing Figures

LIQUID STORAGE RESERVOIR WITH CAPILLARY CONFINEMENT

BACKGROUND AND SUMMARY OF THE INVENTION

The present invention relates to pressurized liquid storage reservoirs of the type comprising a liquid outlet passage having a surface tension retention device defining a buffer zone communicating with said outlet passage and, through orifices and a liquid meniscus breakage zone, with supply channels provided along the wall of the reservoir.

The invention finds a particularly important application in the storage of ergol propellant on board a space vehicle which, during part at least of its orbiting flight, is subjected to only negligible acceleration and gravity whose direction relative to the reservoir may vary. The low point of the reservoir then changes, so that the outlet passage cannot be placed there in such a way that it is permanently fed. Two solutions have been adopted to make a minimum volume of liquid permanently available after a phase of zero gravity operation. A first solution consists in fractionating the reservoir into a variable volume compartment, constantly filled with liquid, and a pressurization gas compartment by means of a diaphragm. Unfortunately, the diaphragms at present available are not compatible with all ergols to a sufficient degree in the long term. A second solution consists in providing the reservoir with ergol retention means which use surface tension for forming, about a draw-off point, a buffer zone storing a volume of single phase ergol and preventing pressurization gas from escaping with the ergol, which gas would affect operation of the nozzles fed by the reservoir.

Most of the retention means in current use comprise capillary passages defined by blades, for they have characteristics (and more especially a maximum pressure difference before breakage of the gas-liquid interface meniscus) which are more uniform and more reproducible because they are more easily cleaned and resist corrosion better than fabrics.

A prior art bladed retention device (French specification No. 2 486 624) comprises a central volume surrounded by a capillary structure formed from radially directed elements which define capillary spaces of a width increasing outwardly. This arrangement has disadvantages and limitations in use. It leads to a large central volume which cannot be drawn off, for the elements can only be extended inwardly in the radial direction within a limit fixed by a minimum width of the capillary spaces. Moreover, some flights may involve high rotational speeds of the vehicle about axes of orientation such that the ergol occupying the buffer zone is forced towards zones from which the retention device cannot be reprimed.

It is an object of the invention to provide a storage reservoir of the above defined type comprising improved retention means. It is a more particular object to provide a device in which a small volume only cannot be drawn. It is an object to substantially eliminate conditions for which the device fails to operate on a satellite.

To this end, there is provided a storage reservoir wherein the orifices are capillary and are provided in a wall situated in the immediate proximity of the point of drawing-off through the outlet passage, which wall defines, with a capillary storage volume, a dead space of comparatively small volume.

The capillary storage volume will generally be in the form of a plurality of substantially coaxial thin annular zones, split up into passages developing in the circumferentially direction of the same order of size as the thickness. These annular zones of the alternating smooth walls and corrugated walls may be defined by a spirally wound strip, the spacing between two turns being fixed by a corrugated sheet. In another embodiment, the annular zones are defined by smooth concentric cylindrical metal shapes, centered by means of corrugated strips.

So as to improve the resistance to transverse accelerations, caused for example by rotation of the space vehicle, the capillary storage volume is advantageously contained in a casing comprising a gas exhaust opening situated on the opposite side to the drawing-off point. This opening will be generally extended by a duct opening in the vicinity of the wall of the reservoir in a region thereof which forms the low point when the reservoir is subjected to a high transverse accelaration.

The meniscus rupture zone, placed around the dead space, will be at a very small distance from the axis of the device, which increases the acceleration threshold likely to cause unpriming of the buffer zone. This rupture zone communicates with the inside of the reservoir through passages formed along the wall by collection and resupply blades. It also communicates with the inside of the reservoir, under the bottom of the casing one face at least of which is made from an unwettable material or which provides confinement decreasing towards the opening into the reservoir through gas removal passages.

The invention will be better understood from reading the following description of particular embodiments thereof, given by way of examples.

SHORT DESCRIPTION OF THE DRAWINGS

DETAILED DESCRIPTION OF PREFERRED EMBODIMENTS

Figure 1:
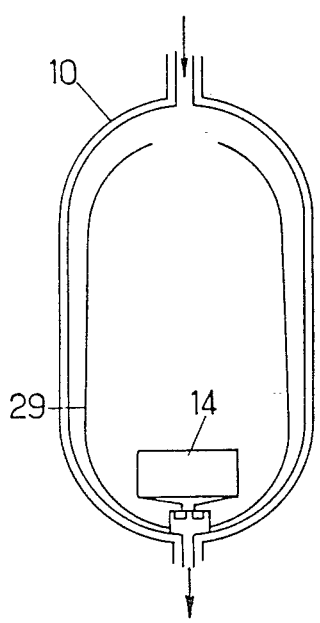
FIG. 1 is a schematical view of a reservoir according to one embodiment of the invention, in section through a plane passing through the axis of the confinement device shown in elevation.
Figure 3:
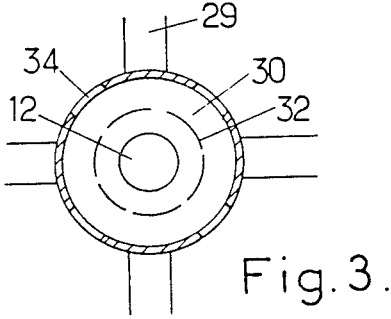
FIG. 3 is a sectional view along line III—III of FIG. 3.

The reservoir shown in FIG. 1, which it will be assumed is intended for storing and supplying an ergol, such as monomethyl hydrazine MMH or nitrogen peroxide $N_2O_4$, in a satellite, has a general conventional construction allowing pressurization by an inert gas without separation membrane. This reservoir 10 comprises a cylindro-spherical shell, generally of alloyed titanium, made from several assembled parts. The zone of the cell which forms the lower point during the ergol supply phases under high acceleration has passing therethrough an outlet passage 12 connected to solenoid valves for supplying the nozzles (not shown).

Passage 12 opens not directly into the reservoir but into a surface tension confinement device which may be considered as formed by a buffer zone capable of retaining a sufficient volume of ergol for individual nozzle operation and a device for collecting ergol along the internal wall of the shell and for supplying the buffer zone during periods of zero gravity operation.

The buffer zone is defined by a casing 14 which contains a capillary structure acting as a sponge, which structure is separated by a grid 16 formed with capillary orifices from a volume 18 surrounding the point of drawing-off through passage 12.

The capillary structure defines channels directed from grid 16 towards lid 20 of the casing 14 and whose hydraulic radius is constant or increases from the grid.

The lid 20 of casing 14 which insulates the buffer zone from the rest of the reservoir is provided with an opening 22 for exhausting gas towards the reservoir. If this reservoir 10 equips a satellite which is not likely to be subjected to high accelerations transversal to the axis of the confinement device, opening 22 may open directly into the reservoir. In the opposite case, it opens into a duct 24 which opens in the vicinity of the low point of the reservoir when the satellite is rotating. The orifices of grid 32 must be capable of withstanding a high hydrostatic pressure if this case is likely to occur (case of a satellite set spinning intentionally or not).

So as to avoid supplying the buffer zone again with ergol through opening 22, with possible imprisonment of gas bubbles, the thickness of the capillary gap between the capillary structure and lid 20 must increase towards opening 22 or remain constant, lid 20 then being coated on the inside with material, such as PTFE, which is unwettable by the ergol.

Similarly, duct 24, if it is provided, must have an increase in hydraulic radius, or, if the radius is constant, be provided with an internal non wettable coating.

Figure 4:
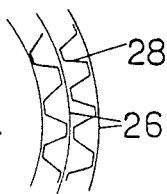
FIG. 4 is a detailed view, in section through a plane transversal to the one of FIG. 2, showing the construction of the channels of the buffer zone.

The capillary structure may be more especially formed by a spirally wound strip 26, the gap between two successive turns being fixed by a corrugated sheet 28 (FIG. 4) which at the same time splits this gap up into separate capillary channels, which reduces the hydraulic radius (so increases the tolerable acceleration without emptying the channels (and improves the stability).

Figure 5A:
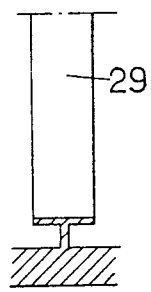
FIGS. 5a and 5b show schematically two possible forms of the resupply blades of the confinement device.
Figure 5B:
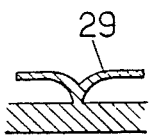

The ergol collection and supply device comprises conventionally several blades 29 spaced evenly apart about the axis of the confinement device, four in number in the case illustrated in FIG. 1. These blades define, with the wall of reservoir 10, capillary ducts for supplying the buffer zone, having a constant thickness or which decreases from the free end of the blade. The cross section of these latter may have very different forms. However, a T shape (FIG. 5a) or a seagull's wing (FIG. 5b) shape will be generally used.

The capillary ducts defined by blades 29 opens into a preferential gas-liquid meniscus rupture space 30, surrounding volume, 18, from which it is separated by a grid 32 with capillary orifices. Space 30 communicates with the inside of the reservoir through gas removal openings 34 limited by the bottom of the envelope 14, coated outwardly with a product, such a polytetrafluoroethylene, which is non wettable by the ergol. The preferential rupture space is dimensioned and placed so that, when an acceleration occurs whose modulus is close to the maximum which the sponge may withstand without driving the ergol out, the buffer zone is isolated from the passages defined by the blades, whatever the orientation of the acceleration.

The different capillary ducts and orifices of the confinement device may have static pressure differences due to the surface tension correctly spaced apart so that the required functions are provided. For greater simplicity, this pressure difference $\Delta P$ will be assumed inversely proportional to the hydraulic radius, which is a sufficient approximation in the case where the uniform section does not differ too much from that of the inscribed circle.

It should first of all be noted that the storage capacity to be given to the reprimable buffer zone under weightless conditions must correspond to the volume of ergol required for each unit operation (about 0.7 l). So that resistance to an acceleration with random orientation is maximum, a shape of the buffer zone must be sought giving a minimum value to the ratio between the volume of ergol stored and the maximum dimension of the shape. If, for manufacturing reasons, it is desired to use a cylindrical shape, the height h of the cylinder must be between once and twice the diameter D of the cylinder. Other reasons will generally lead to adopting a value of D close to h (FIG. 2). the dimension D=h=110 mm may for example be adopted.

So that the canals of the capillary structure may retain the ergol under an acceleration of modulus $\gamma$ and any orientation, $\Delta P$ must be greater than $\rho \gamma H$ (H being the maximum dimension of the buffer zone and $\rho$ the mass per unit volume of the ergol). For a mesh of equilateral section, an acceleration of $5.10^{-2}$ m/s$^2$ leads, with a safety coefficient of 2.8, to a mesh having sides of about 5 mm between strip 26 and sheet 28.

The maximum clearance between the capillary structure and the bottom 34 of casing 14 is determined so as to take into account the cases where the acceleration is orientated from bottom to top. The balance of filling the canals is then unstable. In fact, the weight of the column of liquid in the first canal which begins to empty decreases. This decrease continues until the canal is empty. The clearance between the capillary structure and the bottom of the casing must then withstand the pressure difference of the meniscus in the canals, added to the weight of the liquid column which remain full, the whole with a safety coefficient. In practice, in the case considered above, that will lead to adopting a clearance less than 0.8 mm. The holes in grid 16, which will be generally formed by a plate pierced with round holes or slits, must be provided so that the orifices ensure a static pressure difference greater than double that which the storage canals supply. That generally leads, still for the above considered numerical example, in giving to the grid circular holes 1 mm in diameter or radial slits whose width is of the order of 0.5 mm. The reason why the static pressure difference must be at least double that ensured by the canals is that, when the buffer zone is empty, the orifices of grid 16 must withstand the sum of the pressure difference due to the weight of the liquid and the static pressure difference due to the meniscus in the storage canals.

As for grids 32, they will have to withstand, with a safety coefficient, a pressure difference which is the sum of the hydrostatic pressure $\rho \gamma d$ (d being the distance shown in FIG. 2) in the case of a non spinning satellite, of the static pressure difference of a storage canal meniscus and the pressure drop due to the flow. In practice, a grid 32 will be used having holes of about 1 mm in diameter. However, if the maximum acceleration to be withstood is higher, these holes must have a more reduced diameter and may go down to about 10 microns.

The ducts for resupplying under weightless conditions, defined by blades 29 must be dimensioned so as to supply a sufficient flow, without rupture of the lateral meniscus, during filling of the buffer reservoir, which implies a section of the order of 100 mm² in the example given above. In addition, the resupply blades 29 must be provided so as to reduce as much as possible the volume which cannot be drawn-off; the desire for a zero volume which cannot be drawn-off implies that the spacing between blades 29 and the wall increases the further away from the buffer zone, for example to go from 5 mm to 15 mm. But if a minimum dead mass is sought (some of the mass of the blades and that of the volumes which cannot be drawn-off), the spacing between blades and shell may be constant and such that the static pressure difference of the meniscus formed is less than that of the meniscuses of the buffer zone, with a safety factor. In practice, that may lead to adopting a spacing of 5 mm.

Finally, so that the meniscuses of the buffer zone only have at most to withstand the hydrostatic height h, the meniscus which is opposite supply grid 32 must break before the meniscuses in the canals of the buffer zone. For that, the supply grid 32 must be provided as close as possible to the center of the buffer zone, which leads to putting it about the axis, i.e. in minimizing the distance which separates the resupply grid 32 of the meniscus from the most distant buffer zone. And the static pressure difference $\Delta P$ at which the meniscus between ducts defined by a filling blade 29 and filling grid 32 breaks must fulfil the condition:

$$\Delta P < \Delta P_1(H-d)/H$$

Figure 2:
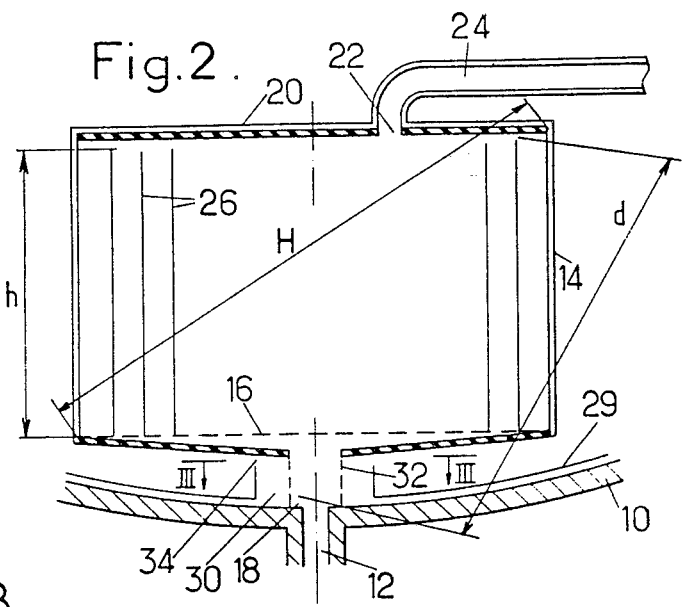
FIG. 2 is an enlarged sectional view of the confinement device of FIG. 1.

H and d represent the distances shown in FIG. 2. $P_1$ is the static pressure difference of a meniscus in a canal of the capillary structure.

In the numerical example discussed above, it has been found that the orifices of grid 32 must provide a static pressure difference of 6.2 Pa for a spacing between two parallel faces of 7.5 mm. In the case of a spacing of 10 mm, we find $\Delta P = 4.64$ Pa.

Still in the same case, grid 20, for improving the minimum acceptable filling rate in the case of rotation and for avoiding filling of the sponge from the top with a stoppage of the pumping, may be provided with an opening 22 10 mm in diameter.

A reservoir comprising a confinement device of this kind has, among other advantages, that of being able to be standardized and used on satellites with very different characteristics, not only for supplying nozzles for transferring to the final orbit but also nozzles for maintenance on station, not only for a rotation stabilized satellite but also for a satellite stabilized along three axes.

It should be noted in this connection that the mission of a satellite comprises different phases, during which it is subjected to accelerations which are very variable in amplitude and in direction and that in addition these accelerations depend on the method of stabilization chosen.

During launching, when the reservoir does not generally have to supply ergol, the acceleration and vibrations are very high. The immersed parts of the confinement device are emptied of ergol and must then be subsequently reprimed for supplying the nozzles.

During transfer, the acceleration is high, but in a well determined direction. For a reservoir fitted with a confinement device of the invention to be then usable, it is then sufficient to place the outlet 12 at a position which will then be close to the low point (along the axis of action of the apogee motor, if it is fed by the reservoir or transversely in the case of a risk of flat spin).

During operation with low acceleration having a random direction, for example during setting and maintenance on station, the amount of ergol consumed for each actuation is small and may be supplied as a whole by the buffer zone of the confinement device which avoids pressurization gas bubbles from passing to the nozzles.

Figure 6:
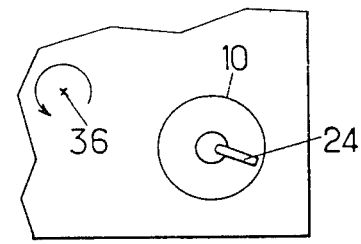
FIG. 6 is a diagram showing the role of the gas removal duct in a satellite which is spin stabilized during certain phases at least of its flight.

On station, between operations, the reservoir is under substantially weightless conditions if the satellite is not set spinning. The ergol is then reorientated so that its free surface corresponds to a minimum of energy and the bubbles possibly formed by desaturation of the ergol are grouped together and join the pressurization gas. During this phase, the buffer zone is resupplied. If the satellite is on the other hand stabilized by rotation, duct 24 orientated away from the axis of rotation 36 (FIG. 6) remains plunged in the mass of residual ergol.

The invention is susceptible of numerous variants. Particularly, it is applicable to the case where the reservoir is split by a dividing wall into two compartments, so that the one which is provided with the outlet passage remains entirely filled with ergol during the whole initial phase of the mission. It also applies to the case where several reservoirs are disposed in series (patent application No. 82 20953. It should be understood that the scope of the present patent extends to such variants as well more generally to all others remaining within the field of equivalences.

I claim:

1. A storage reservoir for pressurized liquid storage, comprising a reservoir wall, a liquid outlet passage through said reservoir having a surface tension retention device defining a buffer zone communicating with said outlet passage and communicating with supply channels formed along the wall of the reservoir through orifices and a liquid meniscus breakage zone, wherein said orifices are capillary and are provided in a partition situated in the immediate proximity of a point of drawing-off through the outlet passage, which partition defines, with a capillary storage volume, a dead space of comperatively small volume.

2. A storage reservoir is set forth in claim 1, wherein the capillary storage volume is in the form of a plurality of substantially coaxial thin annular zones, split up into passages whose circumferential size is of the same order of magnitude as the thickness thereof.

3. A storage reservoir according to claim 2, wherein the capillary storage volume consists of a plurality of zones defined by underleaved alternating smooth wall means and corrugated wall means.

4. A storage reservoir according to claim 2, wherein capillary storage volume is defined by a spirally wound strip and a corrugated sheet between successive turns of said spirally wound strip.

5. A storage reservoir according to claim 2, wherein the capillary storage volume is defined by a plurality of coaxial cylindrical walls.

6. A storage reservoir according to claim 1, wherein said capillary storage volume is contained in a casing having a gas exhaust opening situation on the side opposite to that of the drawing-off point.

7. A storage reservoir according to claim 6, wherein said gas exhaust opening opens into duct means extending to a point located close to said wall of the reservoir in a region thereof which forms the lower point when the reservoir is subjected to an accelerator directed in a direction which is likely to occur during drawing off.

8. A storage reservoir according to claim 7, wherein said duct means has a hydraulic radius in direct relation with the difference from said gas exhaust opening.

9. A storage reservoir according to claim 7, wherein said duct means is internally coated with non wettable material.

10. A storage reservoir according to claim 6, wherein the meniscus breakage zone communicates with an internal volume of said reservoir through passage means defined along said wall of the reservoir by collecting blades located in close proximity to said wall.

11. A storage reservoir according to claim 6, wherein the meniscus breakage zone communicates with an internal volume of said reservoir through passage means defined along said wall, whose surfaces are coated with material which is non wettable by an ergol contained in said reservoir.

* * * * *